United States Patent [19]
Ohmura

[11] Patent Number: 5,802,759
[45] Date of Patent: Sep. 8, 1998

[54] LINE GUIDE FOR A FISHING ROD

[75] Inventor: Ryuichi Ohmura, Shizuoka, Japan

[73] Assignee: Fuji Kogyo Co., Ltd., Shizuoka-ken, Japan

[21] Appl. No.: 954,895

[22] Filed: Oct. 21, 1997

[30] Foreign Application Priority Data

Nov. 12, 1996 [JP] Japan .................................. 8-337412

[51] Int. Cl.⁶ .............................................. A01K 87/04
[52] U.S. Cl. ............................................. 43/24; D22/143
[58] Field of Search ................................ 43/24; D22/143

[56] References Cited

U.S. PATENT DOCUMENTS

| | | | |
|---|---|---|---|
| 387,545 | 8/1888 | Spruce | 43/24 |
| 4,060,924 | 12/1977 | Cunningham | 43/24 |
| 4,507,891 | 4/1985 | Ohmura | 43/24 |
| 5,383,300 | 1/1995 | Stotesbury | 43/24 |
| 5,419,075 | 5/1995 | Oyama | 43/24 |

*Primary Examiner*—Jack W. Lavinder
*Attorney, Agent, or Firm*—Evenson, McKeown, Edwards & Lenahan, P.L.L.C.

[57] ABSTRACT

A line guide for a fishing rod wherein a main frame part of a frame 2 for holding a guide ring 3 is composed of a rear frame 4 slanted upwardly toward a tip end of a fishing rod and a front frame 5 extending from an upper end of the rear frame 4 downwardly toward the tip end making it possible to easily release entanglement of the fishing line around the frame 2 having an oblong guide ring 3 being mounted around a ring mounting hole 9 formed in the rear frame 4 to earn a diameter of the guide ring, a flange 13 extending along an outer circumference of the guide ring 3 being provided, the flange 13 being in contact with a back side circumferential edge portion of the ring mounting hole 9, the remainder of the guide ring 3 being fitted in the ring mounting hole 9 and the removal of the guide ring 3 being firmly prevented.

2 Claims, 5 Drawing Sheets

LINE GUIDE FOR A FISHING ROD

BACKGROUND OF THE INVENTION

The present invention relates to a line guide for a fishing rod, and more particularly to a line guide ring mounted externally on a fishing rod for introducing a fishing line drawn out from a reel.

Today, in general, a line guide mounted externally on a fishing rod includes a hard guide ring, a frame portion for supporting the guide ring, and a fishing rod mounting portion. In order to smoothly introduce the fishing line that has been drawn out from the reel, the guide ring is formed to a true circle in cross section and provided in an upright position relative to an axial direction of the fishing rod.

There are many performances required for such a type line guide ring. For example, it should be light in weight, high in mechanical strength, easy to be free from the line entanglement, and the guide ring should firmly be retained, and so on.

Among these performances, it is important that the line entanglement is readily be coped with. There have been many attempts therefor. As one of these attempts, there is such an approach that a bridge is provided to extend downwardly from an upper portion or an intermediate portion of a frame portion in a butt direction, and the fishing line that has been entangled around the line guide ring is caused to slide by the bridge.

It has also been proposed that the frame portion itself is slanted considerably so that the line entanglement may readily be released. For instance, a line guide a shown in FIG. 7 is disclosed in Japanese Utility Model Application Laid-Open No. 167765/1986 in which a frame b is largely tilted toward the tip end of the fishing rod and form of an opening of a guide ring c is made an oblong or elliptical so that a diameter of the opening is to effectively increase. Accordingly, the fishing line that has been entangled around the frame b is passed forwardly from the ring guide a while sliding along a side surface portion of the guide ring c and a slant surface d of the frame b.

A line guide e shown in FIG. 8 is disclosed in Japanese Patent Application Laid-Open No. 111340/1993. The line guide ring e is manufactured by outserting with a rod body h a cylindrical retainer member c in which a true circular guide ring f is contained. The retainer member a is formed substantially in a trapezoidal shape that is symmetrical in the back-and-forth direction (in the axial direction) as viewed in cross-section. Accordingly, the fishing line that has been entangled around the retainer member q is released away from the line guide ring e while sliding on back-and-forth slant surfaces i of the retainer member g.

The above-described line guide a shown in FIG. 7 suffers from such a disadvantage that the guide ring c may readily be removed and damaged. Namely, since the mounting operation of the guide ring c in the line guide a is performed only by press-fitting the guide ring c in a guide mounting hole j formed in the frame b that is kept in a plain plate, the guide ring c is exposed for the most part without any protection, and in addition, the guide ring is very likely to be damaged. Moreover, when a rather strong shock is applied to the guide ring c, the guide ring c would readily be pulled apart from the guide mounting hole j.

In particular, in the case where the guide ring c is formed of a ceramic material or the like into an oblong or elliptical shape, it is very difficult to meet the dimensional precision. Accordingly, there are many cases that the guide ring c would not firmly be retained at the guide mounting hole j. Due to large loads in lifting catch, or shocks from knots of the fishing line or sinkers bumping the line guides, the guide ring c is more likely to be removed than expected.

Also, in order to enhance the mechanical strength of the frame b, it is necessary to increase the thickness of the material thereof. Accordingly, the weight thereof is increased, disadvantageously.

In the line guide ring e shown in FIG. 8, since the guide ring f is received in a deep position of the retainer member g, there is almost no fear that the guide ring f would be damaged. Also, since the outer circumferential portion of the guide ring f is embedded in the retainer member a, the guide ring f is not easily removed.

However, there are such problems that it is troublesome to manufacture the line guide e, it is impossible to replace or repair the line guide e and the retainer member g causes the flexibility of the fishing rod body h to be completely lost over a certain range.

SUMMARY OF THE INVENTION

In order to overcome the above-noted defects inherent in the above-described conventional technology, an object of the present invention is to provide a line guide for a fishing rod, in which a release of the fishing line entanglement of the fishing line may readily be performed, at the same time, it is possible to firmly retain an oblong guide ring, and in addition it is possible to enhance a mechanical strength without increasing a weight thereof but it is possible to prevent a damage of the guide ring.

According to a first aspect of the invention, there is provided a line guide for a fishing rod, mounted externally thereon and provided with a guide ring through which a fishing line that has been drawn out from the reel, comprising a rear frame in which an oblong ring mounting hole is formed and slanted toward a tip end of the fishing rod, a front frame extending from a tip end of said rear frame toward the fishing rod body and having a line passing hole, each mounting foot extending from said rear frame and said front frame, and an oblong guide ring mounted on said rear frame, wherein said guide ring has a flange extending along an outer circumference of said guide ring, said flange is in contact with a back side circumferential edge portion of the ring mounting hole and the remainder of said guide ring is fitted in the ring mounting hole.

Of a second aspect of the invention in the foregoing first aspect, in the line guide ring, both right and left side portions of said rear frame are curved to form protective walls.

DESCRIPTION OF THE PREFERRED EMBODIMENTS

A line guide for a fishing line in accordance with an embodiment of the present invention will now be described in detail with reference to the accompanying drawings.

Figure 1:
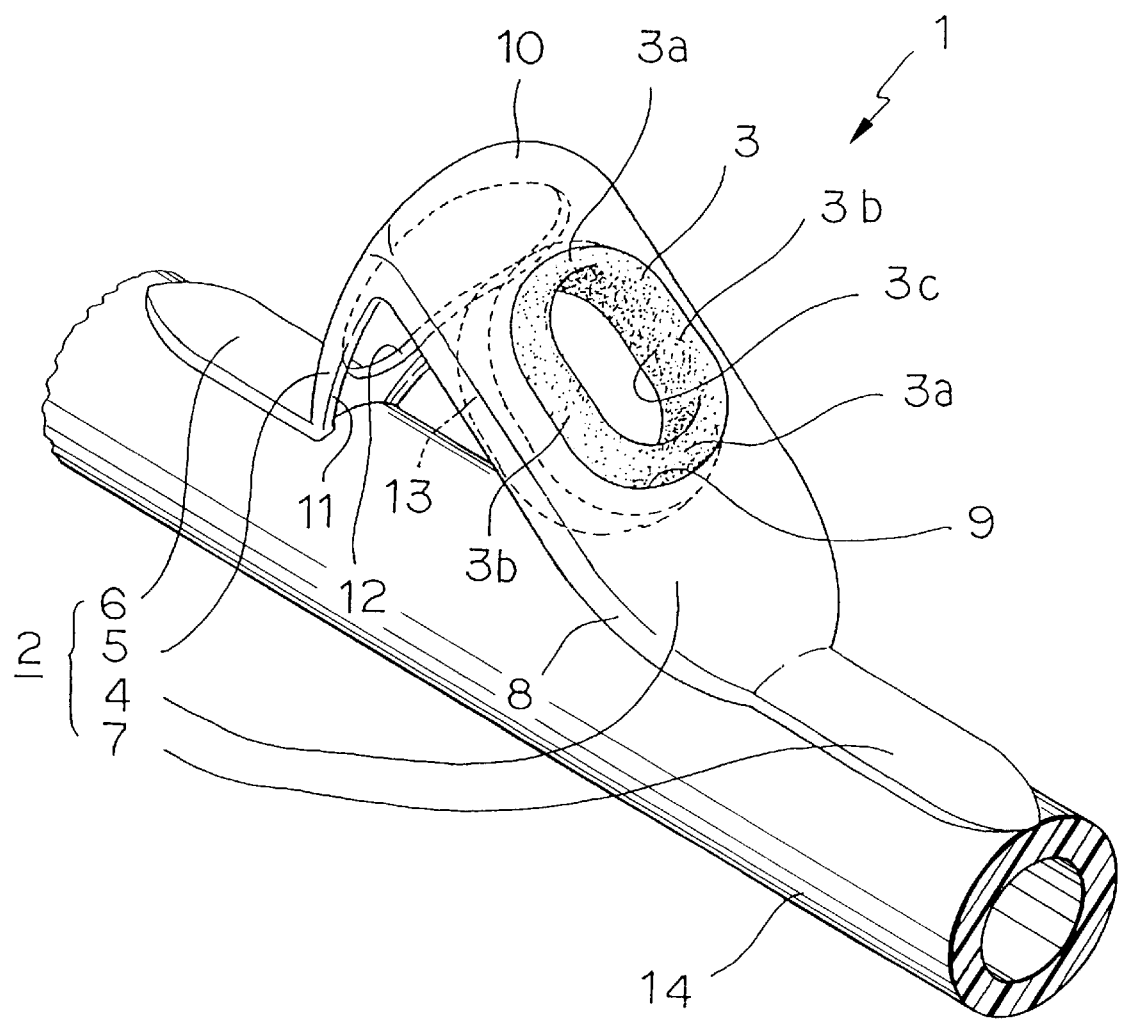
FIG. 1 is a perspective view showing a fishing rod line guide ring according to the present invention, which is placed on a fishing rod.
Figure 2:
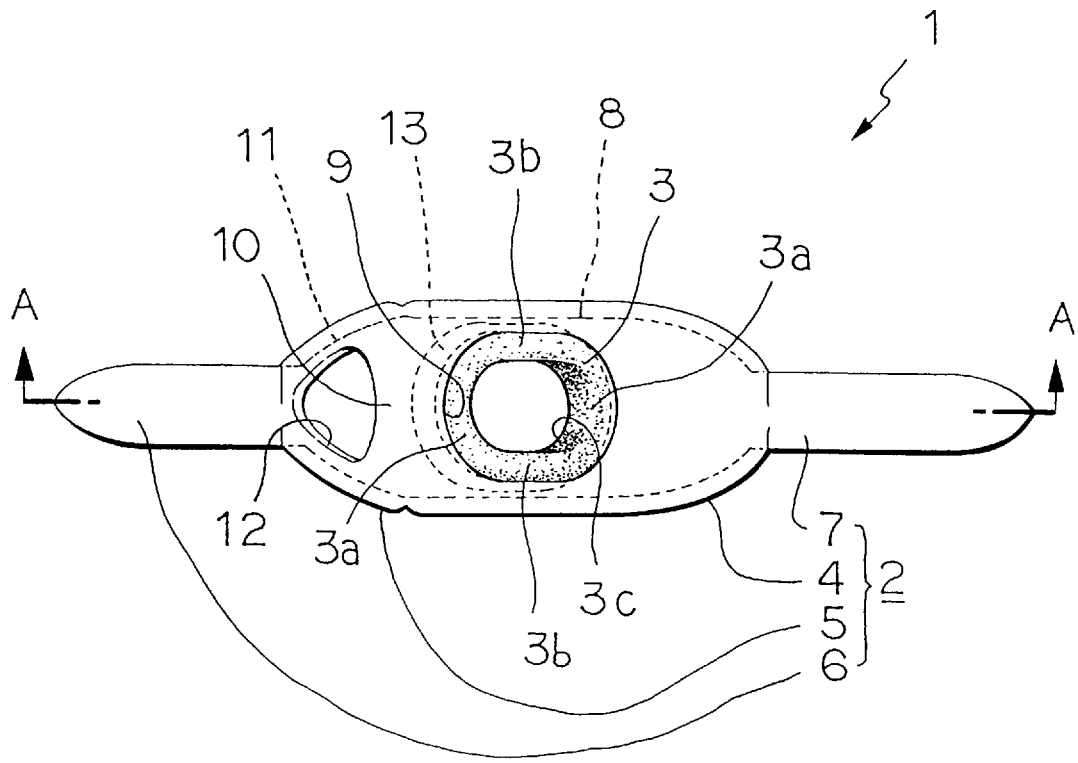
FIG. 2 is a plan view of the line guide shown in FIG.
Figure 3:
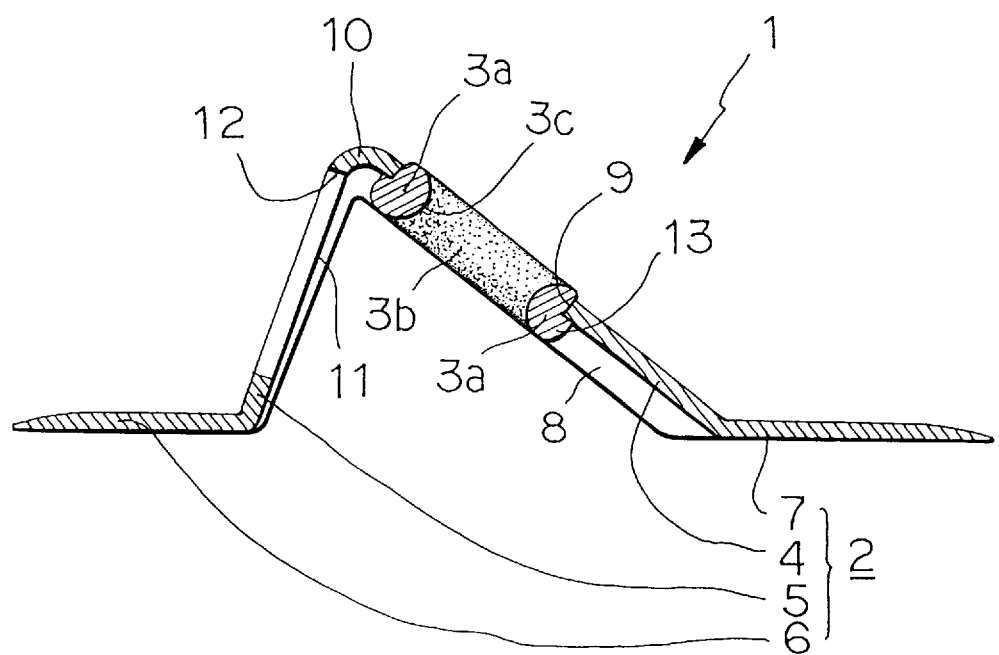
FIG. 3 is a cross-sectional view taken along the line A—A of FIG. 2.

Reference numeral 1 generally denotes a line guide for a fishing rod (mainly with reference to FIGS. 1 to 3) which includes a frame 2 made of metal, and a guide ring 3 retained to the frame 2.

A guide ring 3 is formed into an oblong shape, i.e., with both front and rear end portions 3a being in the form of semicircular shapes and an intermediate portion 3b extending in a linear shape.

The frame 2 is formed integrally of a metal plate by pressing and is composed of a rear frame 4 slanted upwardly toward the tip end of the fishing rod (in a left upward direction in FIG. 1), a front frame 5 extending downwardly from a top end of the rear frame 4, and front and rear mounting feet 6 and 7 extending from the lower ends of the rear frame 4 and the front frame 5, respectively. Accordingly, as viewed from either right or left side of the fishing rod guide ring 1, the portions of the frame 2 other than the mounting feet 6 and 7 are formed substantially in a mountain-like shape.

The mounting feet 6 and 7 are formed into relatively slim plate-like shapes having a width that is about one third of that of the rear frame 4 and the front frame 5 and are substantially flush with each other.

The slant angle of the rear frame 4 is at about 40° C. to the plain on which the mounting feet 6 and 7 are located.

The rear frame 4 has a substantially rectangular shape that is long back and forth, as viewed in a direction perpendicular to its slant surface, with its rear end portions of both right and left side edges are curved and continued with the rear mounting foot 7 while decreasing its width toward its rear end.

Further, both right and left side portions of the rear frame 4 are curved downwardly to form protective walls 8 having a relatively small width. The protective walls contribute not only to the protection of the guide ring 3 but also the enhancement of the mechanical strength of the rear frame 4, in particular, the mechanical strength against a bend in a direction of its thickness.

Reference numeral 9 denotes a ring mounting hole formed in the rear frame 4. The ring mounting hole 9 is in the form of an oblong shape extending in a longitudinal direction somewhat of the rear frame 4 and is formed so as to fit the guide ring 3 with its center being located at a position sided toward a top front end off the center of the rear frame 4.

A long side dimension of the guide ring 3 is about 1.5 times greater than a short side dimension thereof.

The front frame 5 is slanted at about 80° C. to the plain on which the mounting feet 6 and 7 are located and is formed into an inverted trapezoidal shape having a transverse width decreased on the lower side. Its upper end is continuous with the upper end of the rear frame 4. A top portion 10 at which the rear frame 4 and the front frame 5 are continuous with each other is bent in an arcuate shape.

Both right and left side portions of the front frame 5 are curved rearwardly to form a reinforcement wall 11 having a smaller width. A bending strength of the front frame 5 is enhanced by the reinforcement wall 11.

Reference numeral 12 denotes a line passing hole formed in the central portion of the front frame 5. The line passing hole 12 has a substantially similar shape with a contour of the front frame 5.

The guide ring 3 is in the form of an oblong shape with a flange. In other words, the outer contour of the guide ring 3 is formed in the oblong shape that well fit the above-described ring mounting hole 9. The flange 13 is formed which projects at a substantially middle portion of its outer circumferential surface.

The guide ring 3 is mounted on the rear frame 4 by contacting the flange 13 with the back side circumferential edge portion of the mounting hole 9 and fitting the remainder with the ring mounting hole 9.

Incidentally, in order to maintain the mounting condition of the guide ring 3 in a better condition, it is preferable to apply an adhesive to the portion where the guide ring 3 and the rear frame 4 are in contact with each other.

The thus constructed line guide for a fishing rod 1 is mounted on the fishing rod body 14 with the rear frame 4 being relatively located on the butt side and the front frame 5 being located relatively on the tip side, under the condition that the mounting feet 6 and 7 are seated around the circumferential surface of the fishing rod body (which is sometimes referred to as a blank) by winding a thread around the mounting feet 6 and 7.

Accordingly, in the fishing rod body 14, the flexibility may be suppressed in the portion where the mounting feet 6 and 7 are fixed but the flexibility is maintained in the portion corresponding to the rear frame 4 and the front frame 5.

A hole 3c of the guide ring 3 is formed into a substantially circular shape as viewed in the axial direction of the fishing rod body 14. Accordingly, it is possible to sufficiently keep a diameter enough for guiding the fishing line in a good condition even if the guide ring 3 is provided in the slanted condition.

Under such a condition that the fishing rod line guide 1 is mounted on the fishing rod body 14, most of the portion of the guide ring 3, i.e., almost all the portion other than a small portion projecting from the rear frame 4 is located in a space surrounded by the frame 2 and the fishing rod body 14. Thus, this makes it possible to well prevent the guide ring 3 from being damaged. In this case, since the protective walls 8 of the rear frame 4 are located to cover the guide ring 3 from the sides, there is no fear that something is brought into contact with the guide ring 3 even if the fishing rod is laid on the ground.

Also, since the flange 13 of the guide ring 3 is in contact with the opening edge portion of the ring mounting hole 9 on the rear side of the rear frame 4, even if knotted portions of the fishing line, swivels or sinkers are brought into contact with the guide ring 3 when the fishing line to which a load of fish is applied is retrieved, there is no fear that the guide ring 3 would be pulled apart from the rear frame 4.

Then, since the rear frame 4 is slanted as described above, even if the fishing line is entangled around the frame 2, if a tension is applied to the fishing line, the entangled portion slides along the slanted surface of the rear frame 4 to move forwardly with ease.

Figure 4:
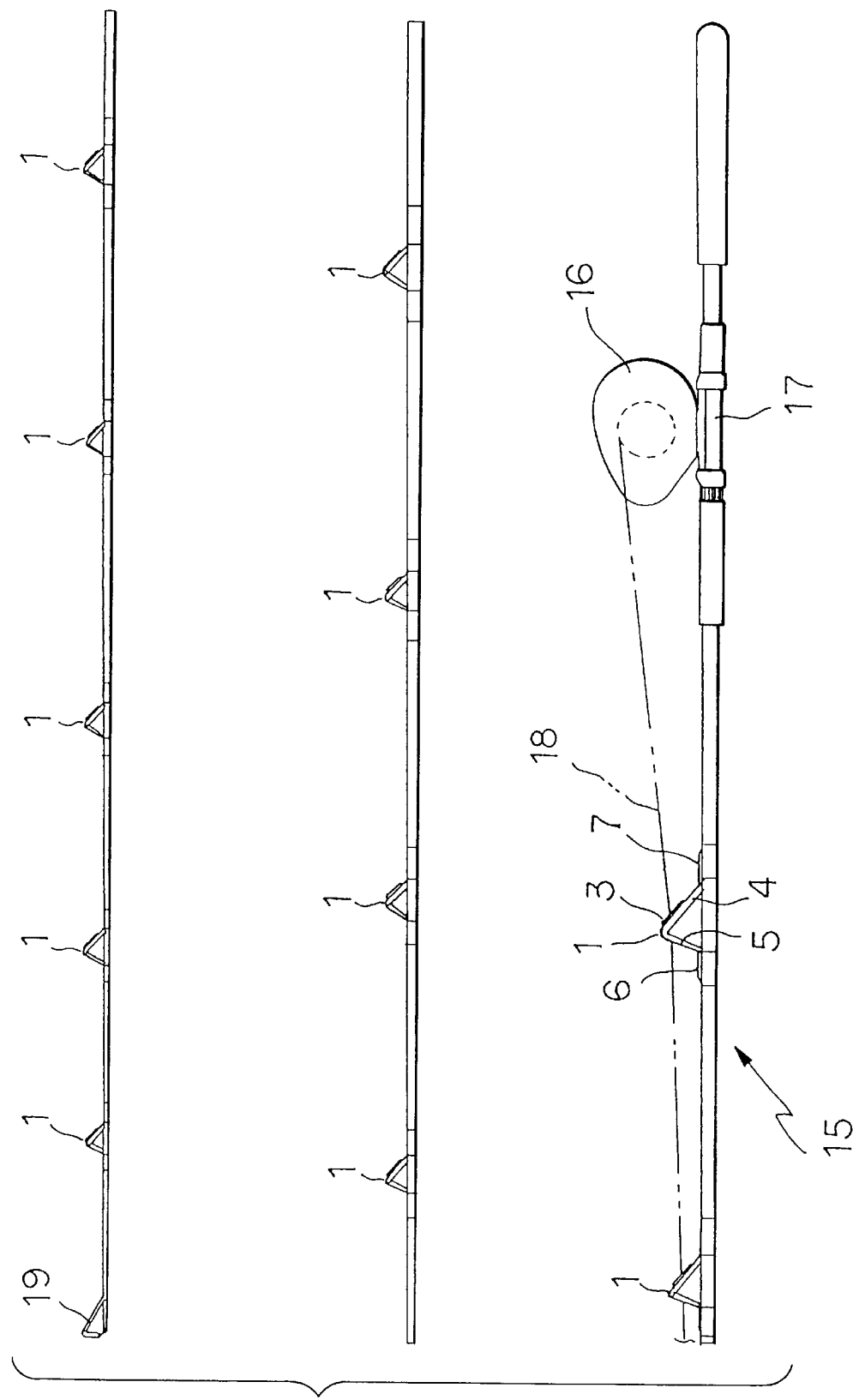
FIG. 4 is a side elevational view showing one example of a spliced rod on which the line guides shown in FIG. 1 are mounted.

FIG. 4 shows one example of rod sections 15 using the above-described fishing rod line guide 1 for all the line guides thereof. Reference numeral 16 denotes a reel mounted on the reel seat 17. The fishing line 18 that has been drawn out from the reel 16 is caused to pass through the rings 3 and the line passing holes 12 of the fishing rod line guide rings 1, 1, . . . In this case, as far as any tension is applied to the fishing line 18, there is no fear that it is brought into contact with the inner circumferential surface of the line passing holes 12.

Reference numeral 19 indicates a top guide.

In such a fishing rod 15, it is easy to release the entanglement of the fishing line at any one of the fishing line guide rings 1, 1, . . . , and at the same time the guide rings 3 are firmly held and protected.

Figure 5:
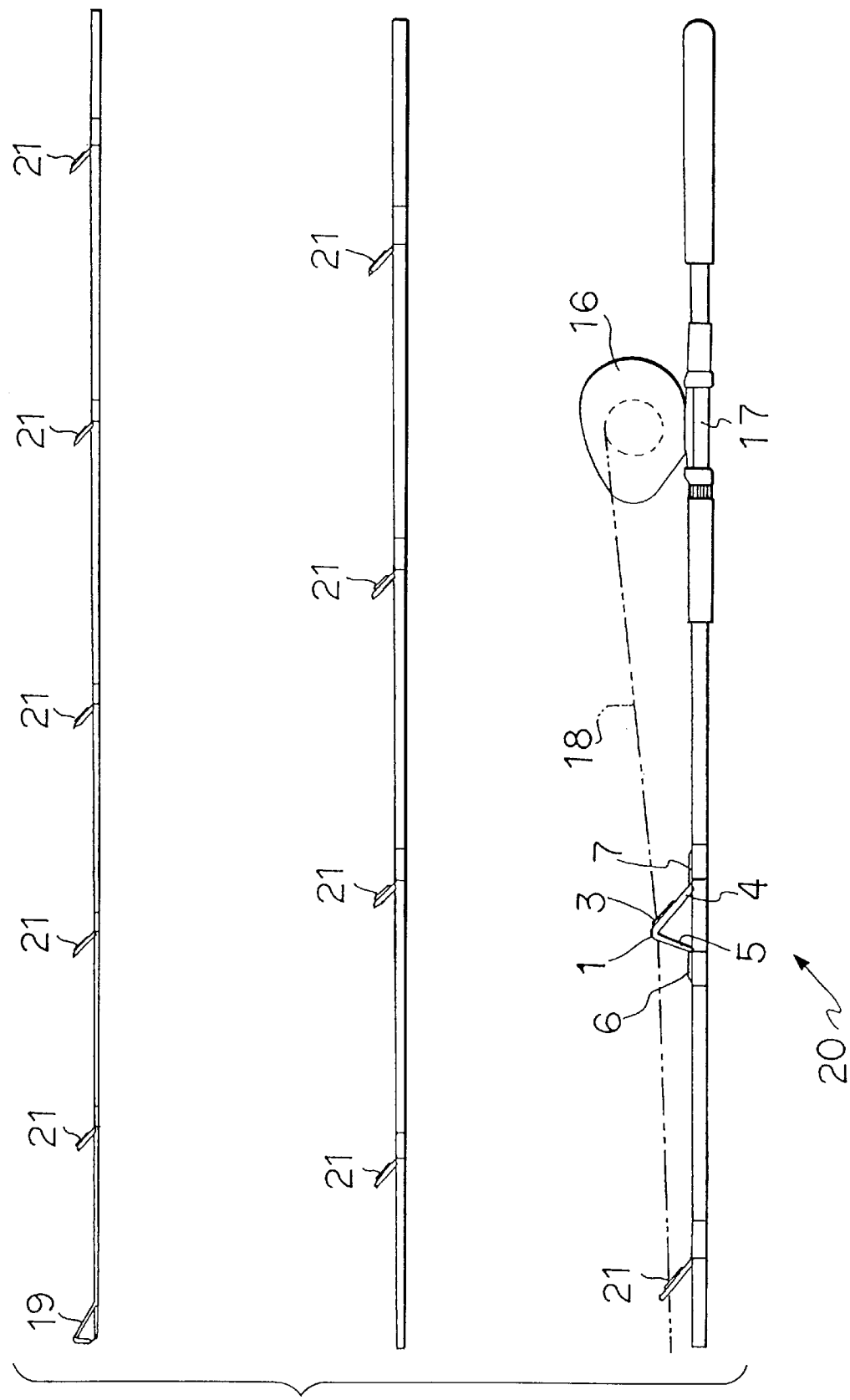
FIG. 5 is a side elevational view showing another example of a rod section on which the line guide shown in FIG. 1 is mounted.
Figure 6:
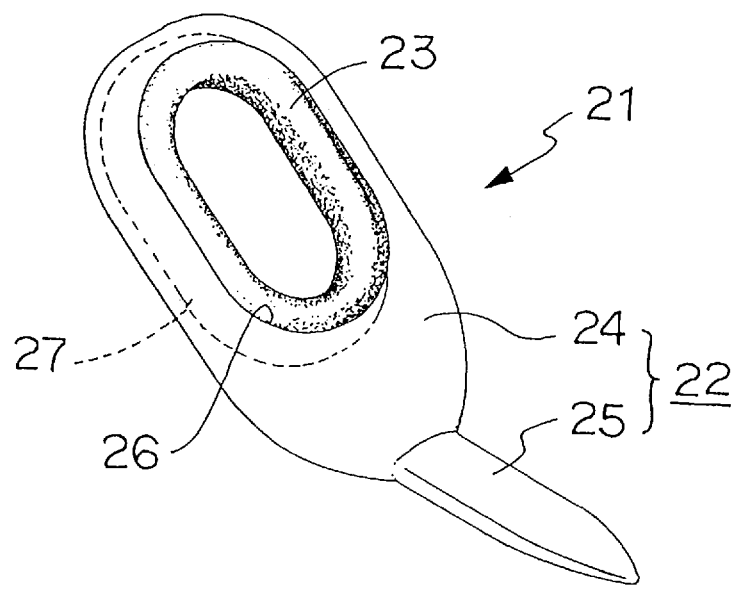
FIG. 6 is an enlarged perspective view showing the line guide shown in FIG. 5.
Figure 7:
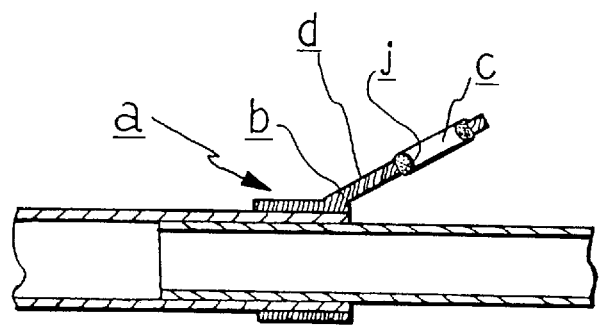
FIG. 7 is a cross-sectional view showing an example of a conventional fishing rod line guide.
Figure 8:
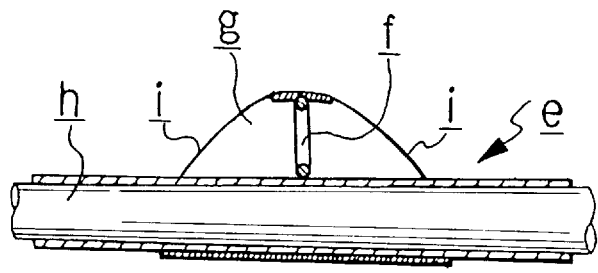
FIG. 8 is a cross-sectional view showing another example of a conventional fishing rod line guide.

FIGS. 5 and 6 show another example of rod sections 20. In the fishing rod 20, the above-described fishing line guide 1 is used only as a butt guide and one-foot type ones are used as the line guides 21.

The line guide ring 21 has a structure substantially the same as that of the rear half of the fishing rod line guide 1. Namely, the line guide 21 is composed of a metal frame 22 and a hard guide ring 23. The frame 22 is composed of a main frame portion 24 that is slanted obliquely and upwardly toward the tip end of the fishing rod and a mounting foot 25 extending rearwardly and horizontally from the lower end of the main frame portion 24. An oblong guide ring 23 is mounted around an oblong ring mounting hole 26 formed in the main frame portion 24. A flange 27 is provided to the guide ring 23 so that the flange 27 is in contact with the back side circumferential edge portion of the ring mounting hole 26. Then, the outer circumferential portions of the main frame portion 24 are curved downwardly to form the protective walls 28.

Accordingly, in the same manner as with the fishing rod line guide 1, the line guide 21 has the function of readily releasing the fishing line entanglement, the strength of the frame 22 is enhanced, and the guide ring 23 is firmly held and protected.

In such a fishing rod 20, the fishing line entanglement may readily be released at any one of the fishing line guide 1, and guide rings 21, 21, . . . , and all the guide rings 3 and 23 are firmly held and protected. In particular, in the fishing rod 20, since the line guides 21 other than the fishing line guide 1 are one-foot type ones, the flexibility of the fishing rod is not sacrificed but since all the guide rings are slanted substantially in the same manner, the rod is so well-balanced as a whole as to give it an aesthetic advantage.

The specific examples of the present invention have been explained above but the specific structure of the present invention is not limited to the foregoing embodiments. It is apparent that changes and modifications in the design are possible without departing from the scope of the present invention.

Incidentally, in the foregoing embodiments, the present invention is applied in general to the fishing line guide that is suitable for the fishing rod using a bait reel but it is also possible to apply the present invention to a line guide for a fishing rod using a spinning reel. In this case, it is sufficient to reverse the concept of up-and-down directions for each parts of the above-described embodiments.

As is apparent from the foregoing description, in the line guide for a fishing rod according to the present invention, since the frame is bent to form a substantially mountain-like shape, the strength of the frame is high and in addition, it is possible to readily release the entanglement of the fishing line.

Also, since the most of the portion of the guide ring is located in a space surrounded by the frame and the fishing rod body, it is possible to well prevent the guide ring from being damaged.

Also, since the flange of the guide ring is in contact with the opening edge portion of the ring mounting hole on the rear side of the rear frame, even if knotted portions of the fishing line, swivels or sinkers are brought into contact with the guide ring when the fishing line to which a load of fish is applied is retrieved, there is no fear that the guide ring would be pulled apart from the rear frame.

In the line guide for a fishing rod according to a second aspect of the present invention, since there are provided the protective walls located so as to cover the guide ring on both right and left sides of the rear frame, even if the fishing rod is laid on the ground, there is no fear for the guide ring to be contacted by any other object so that the protection of the guide ring is further enhanced.

What is claimed is:

1. A line guide for a fishing rod, mounted externally thereon and provided with a guide ring through which a fishing line that has been drawn out from the reel, comprises a rear frame in which an oblong ring mounting hole is formed and slanted toward a tip end of the fishing rod, a front frame extending from a tip end of said rear frame toward the fishing rod body and having a line passing hole, each mounting foot extending from said rear frame and said front frame, and an oblong guide ring mounted on said rear frame, wherein said guide ring has a flange extending along an outer circumference of said guide ring, said flange is in contact with a back side circumferential edge portion of the ring mounting hole and the remainder of said guide ring is fitted in the ring mounting hole.

2. The line guide according to claim 1, wherein both right and left side portions of said rear frame are curved to form protective walls.

* * * * *